US009200648B2

(12) United States Patent
Lumkes et al.

(10) Patent No.: US 9,200,648 B2
(45) Date of Patent: Dec. 1, 2015

(54) FLUID CONTROL VALVE SYSTEMS, FLUID SYSTEMS EQUIPPED THEREWITH, AND METHODS OF USING

(75) Inventors: John H. Lumkes, Lafayette, IN (US); Mark Allen Batdorff, Washington, IL (US); Kyle Joseph Merrill, Lafayette, IN (US); Michael Andrew Holland, Conrad, IA (US); Gabriel Jordan Wilfong, Carmel, IN (US)

(73) Assignee: Purdue Research Foundation, West Lafayette, IN (US)

( * ) Notice: Subject to any disclaimer, the term of this patent is extended or adjusted under 35 U.S.C. 154(b) by 971 days.

(21) Appl. No.: 13/357,517

(22) Filed: Jan. 24, 2012

(65) Prior Publication Data

US 2012/0186659 A1    Jul. 26, 2012

Related U.S. Application Data

(60) Provisional application No. 61/435,508, filed on Jan. 24, 2011.

(51) Int. Cl.
*F16K 15/18* (2006.01)
*F04B 7/02* (2006.01)
*F15B 13/02* (2006.01)

(52) U.S. Cl.
CPC .............. *F15B 13/027* (2013.01); *F04B 7/02* (2013.01); *F04B 7/0266* (2013.01);
(Continued)

(58) Field of Classification Search
USPC .......... 251/26, 30.01, 31, 63.5; 137/493, 512, 137/538, 565.18, 565.19, 596.16, 596.17, 137/596.18, 613, 14, 565.14, 565.15; 417/507, 588, 589
See application file for complete search history.

(56) References Cited

U.S. PATENT DOCUMENTS 570,727 A * 11/1896 Gale ............................. 137/487
641,896 A *  1/1900 Sergeant ....................... 417/507
(Continued)

FOREIGN PATENT DOCUMENTS

EP          0494236          7/1992
EP          0494236 B1  * 12/1995

OTHER PUBLICATIONS

Bernd Winkler, Rudolf Scheidl; "Development of a Fast Seat Type Switching Valve for Big Flow Rates"; Linz Center of Mechatronics, Linz, Austria; The Tenth Scandinavian International Conference on Fluid Power, SICFP '07, May 21-23, 2007, vol. 13, pp. 402-407, 207.
(Continued)

*Primary Examiner* — Craig Schneider
*Assistant Examiner* — Jonathan Waddy
(74) *Attorney, Agent, or Firm* — Hartman Global IP Law; Gary M. Hartman; Domenica N. S. Hartman

(57) ABSTRACT

A fluid control valve system suitable for use in fluid systems. The valve system includes at least one check valve assembly that has a controllable bidirectional flow capability. The valve system and its check valve assembly can be installed in a fluid system that contains a pump/motor to enable the displacement output of the pump/motor to be controlled. The valve system further includes a pilot valve assembly and a device for controlling the check and pilot valve assemblies. The controlling device is adapted to control the pressure of at least one pilot fluid delivered to the pilot valve assembly, which enables the check valve assembly to selectively check flow of a working fluid flowing therethrough in either of two directions.

24 Claims, 8 Drawing Sheets

(52) U.S. Cl.
CPC ........ *F16K 15/186* (2013.01); *Y10T 137/0396* (2015.04); *Y10T 137/7758* (2015.04); *Y10T 137/7771* (2015.04); *Y10T 137/7838* (2015.04); *Y10T 137/85978* (2015.04); *Y10T 137/8601* (2015.04)

(56) References Cited

U.S. PATENT DOCUMENTS

| | | | | |
|---|---|---|---|---|
| 679,955 | A | * | 8/1901 | Daw ............... 417/507 |
| 708,716 | A | * | 9/1902 | Kennedy ............. 417/507 |
| 765,359 | A | * | 7/1904 | Daw et al. ........... 417/507 |
| 769,833 | A | * | 9/1904 | Rarig ............... 417/507 |
| 803,192 | A | * | 10/1905 | Prellwitz ............ 417/507 |
| 818,567 | A | * | 4/1906 | Sergeant ............ 251/48 |
| 898,135 | A | * | 9/1908 | Prellwitz ............ 417/507 |
| 2,975,800 | A | * | 3/1961 | Doelger et al. ........ 137/565.14 |
| 3,604,679 | A | * | 9/1971 | Pennington .......... 251/26 |
| 3,933,167 | A | | 1/1976 | Byers, Jr. |
| 4,282,896 | A | | 8/1981 | Makino |
| 4,326,839 | A | * | 4/1982 | Fry et al. ........... 417/295 |
| 4,447,193 | A | * | 5/1984 | Bunn et al. .......... 417/441 |
| 4,993,921 | A | | 2/1991 | Taplin et al. |
| 5,048,561 | A | | 9/1991 | Taplin et al. |
| 5,174,335 | A | * | 12/1992 | Iwabuchi ............ 137/624.18 |
| 5,190,446 | A | | 3/1993 | Salter et al. |
| 5,906,352 | A | * | 5/1999 | Post ................ 251/44 |
| 6,000,417 | A | | 12/1999 | Jacobs |
| 6,164,930 | A | * | 12/2000 | Tremoulet, Jr. ........ 417/401 |
| 6,216,729 | B1 | | 4/2001 | Hambly et al. |
| 6,328,052 | B1 | | 12/2001 | Loyning |
| 7,077,378 | B2 | | 7/2006 | Rampen et al. |
| 7,261,030 | B2 | | 8/2007 | Liberfarb et al. |
| 2002/0053651 | A1 | * | 5/2002 | Fukano et al. ........ 251/28 |
| 2007/0289649 | A1 | | 12/2007 | Batdorff et al. |
| 2009/0210120 | A1 | | 8/2009 | Stein et al. |
| 2009/0235657 | A1 | | 9/2009 | Rampen et al. |
| 2009/0302251 | A1 | | 12/2009 | Caldwell |
| 2009/0317266 | A1 | | 12/2009 | Rampen et al. |
| 2010/0037604 | A1 | | 2/2010 | Rampen et al. |
| 2010/0084587 | A1 | | 4/2010 | Stein |

OTHER PUBLICATIONS

Bernd Winkler, Andreas Plockinger, Rudolf Scheidl; "A Novel Piloted Fast Switching Multi Poppet Valve", The Second Workshop on Digital Fluid Power, Nov. 12-13, 2009, Linz, Austria, pp. 116-128.

* cited by examiner

| | Energization State of Control Valve Assembly 12 (Pump/Motor Piston Position) | | | | Energization State of Control Valve Assembly 12' (Pump/Motor Piston Position) | | | |
|---|---|---|---|---|---|---|---|---|
| | 1 | 2 | 3 | 4 | 1 | 2 | 3 | 4 |
| Pumping Mode: (Port A = LP; Port A' = HP) | | | | | | | | |
| 100% displacement | Off | Off | Off | Off | Off | Off | Off | Off |
| 50% displacement | Off | Off | On | Off | Off | Off | Off | Off |
| 0% displacement | Off | Off | On | On | Off | Off | Off | Off |
| Motoring Mode: (Port A = HP; Port A' = LP) | | | | | | | | |
| 100% displacement | Off | Off | On | On | On | On | Off | Off |
| 50% displacement | Off | Off | On | On | On | Off | Off | Off |
| 0% displacement | Off | Off | On | On | Off | Off | Off | Off |

FIG. 5

FLUID CONTROL VALVE SYSTEMS, FLUID SYSTEMS EQUIPPED THEREWITH, AND METHODS OF USING

CROSS REFERENCE TO RELATED APPLICATIONS

This application claims the benefit of U.S. Provisional Application No. 61/435,508, filed Jan. 24, 2011, the contents of which are incorporated herein by reference.

STATEMENT REGARDING FEDERALLY SPONSORED RESEARCH

This invention was made with government support under Contract No. EEC 0540834 awarded by the National Science Foundation. The Government has certain rights in the invention.

BACKGROUND OF THE INVENTION

The present invention generally relates to valves for use in fluid systems. More particularly, this invention relates to a high-speed, high-flow active bidirectional check valve suitable for use in a fluid working machine, for example, a digital hydraulic pump/motor.

Hydraulic pumps and motors are necessary fundamental building blocks for many fluid power systems. However, conventional hydraulic pump/motors typically have peak efficiencies of about 70-95% due to losses. One of the major sources of losses in pumps/motors is viscous friction in the valve plate, leakage, and the inability for fixed port timing to be adjusted for different operating conditions. It is possible to eliminate or reduce losses and increase efficiency by replacing the pump/motor valve plate with valves. For example, the valve plate is replaced with a passive check valve in what are referred to as "check ball" pumps. As used herein, the term "passive" means that the valves are not operated with electronics, but instead are operated by a mechanical mechanism, for example, force applied by a spring or pressure. However, it is not possible for a check ball pump to operate in a motoring mode and control flow, pressure, or other parameters. If a pump/motor uses active (in other words, electronically controlled) valves, then valve timing can be used to vary flow, pressure and/or displacement and achieve what can be referred to as a highly efficient variable-displacement "digital pump/motor."

A challenge to creating a digital pump/motor is the design of the active valves. For example, the valves must be capable of operating at high speeds, for example, capable of transition times of less than 1.5 milliseconds. Other desirable operational capabilities include low actuation energy (low power consumption), a large flow area when open (low pressure drop), and low leakage when shut. The valves should also be reliable, preferably capable of lives exceed one million cycles, yet be relatively low cost.

Various digital pumps/motors have been proposed. One example is reported in B. Winkler and R. Scheidl, "Development of a fast seat type switching valve for big flow," Ventil, vol. 13, pp. 402-7 (2007), and describes a valve with coplanar sealing surfaces that uses a pilot stage and hydraulic pressure to actuate it. The poppet is pilot-operated (two-stage valve). Another example is reported in B. Winkler, A. Plöckinger, and R. Scheidl, "A Novel Piloted Fast Switching Multi Poppet Valve," The Second Workshop on Digital Fluid Power, 12th-13th Nov. 2009, Linz, Austria, pp. 116-128, which describes a valve with coplanar sealing surfaces, multiple poppets and therefore multiple flow paths. Again, the poppets are pilot-operated (two-stage valve). U.S. Published Patent Application No. 2007/0289649 discloses an annular valve that utilizes a plurality of flow passages to achieve a large flow rate. The poppet is annular and flow passages are spaced axially.

Though significant advancements have been made with digital pumps/motors as described above, further improvements would be desirable.

BRIEF DESCRIPTION OF THE INVENTION

The present invention provides fluid control valve systems suitable for use in various types of fluid systems and with various types of pumps and motors. The valve systems enable the displacement output of a pump and/or motor (pump/motor) to be controlled through the operation of one or more check valve assemblies that have a controllable bidirectional flow capability.

According to a first aspect of the invention, a fluid control valve system is provided that includes a check valve assembly, a pilot valve assembly, and means for controlling the check and pilot valve assemblies. The check valve assembly includes a check valve housing and a movable member disposed within an interior of the check valve housing for axial movement between an open and closed position. First and second fluid ports are coupled to the check valve housing and through which a working fluid enters and exits the check valve housing. The first and second fluid ports are fluidically connected via the interior of the check valve housing when the movable member is in the open position, and are fluidically isolated from each other by the movable member when the movable member is in the closed position. The pilot valve assembly includes a pilot housing, a pilot piston disposed within an interior of the pilot housing for axial movement therein, and a pilot stem that mechanically couples the pilot piston to the movable member of the check valve assembly. The pilot piston defines first and second pilot chambers within the pilot housing, and first and second pilot ports are fluidically coupled to the first and second pilot chambers, respectively, through which at least one pilot fluid enters and exits the pilot housing. The controlling means is adapted to control the pressure of the at least one pilot fluid within the first and second pilot chambers of the pilot housing to enable the check valve assembly to selectively check flow of the working fluid flowing from the first fluid port to the second fluid port or check flow of the working fluid flowing from the second fluid port to the first fluid port.

According to a second aspect of the invention, a method is provided for operating a fluid control valve system that comprises a check valve assembly having a movable member that is movable with a pilot valve assembly between a closed and open position. In the closed position, the movable member checks flow of a working fluid through the check valve assembly, and in the open position the movable member allows the working fluid to flow through the check valve assembly between first and second fluid ports thereof. The method includes controlling a pressure of at least one pilot fluid within the pilot valve assembly to enable the movable member of the check valve assembly to selectively check flow of the working fluid flowing from the first fluid port to the second fluid port or check flow of the working fluid flowing from the second fluid port to the first fluid port.

According to another aspect of the invention, a fluid system is provided that includes a fluid source of a working fluid, a pump/motor adapted to pump and/or motor the working fluid, and a destination or use for the working fluid after the working fluid exits the pump/motor. The pump/motor has a working chamber and first and second working chamber ports through which the working fluid is able to enter and exit the working chamber. The fluid system further includes a fluid control valve system fluidically coupled to the first and second working chamber ports of the pump/motor. The fluid control valve system includes first and second bidirectional check valve assemblies that are operable to enable the pump/motor to operate as a variable displacement pump/motor as a result of the first bidirectional check valve assembly being capable of selectively checking flow of the working fluid flowing from the fluid source to the working chamber of the pump/motor or checking flow of the working fluid flowing from the working chamber of the pump/motor to the fluid source, and the second bidirectional check valve assembly being capable of selectively checking flow of the working fluid flowing from the working chamber of the pump/motor to the destination or checking flow of the working fluid from the destination to the working chamber of the pump/motor.

A technical effect of the invention is the ability to provide additional control of a pump/motor in a manner that enables the pump/motor to be operated as a variable-displacement digital pump/motor by enabling one or more individual check valve assemblies to operate bidirectionally, meaning that the valve can be controlled to selectively check flow in either of two directions. A check valve assembly of this invention can be sized to accommodate large flow rates, while the pilot valve assembly associated with the check valve assembly can be sized to achieve fast speeds for the check valve assembly. Other aspects and advantages of this invention will be better appreciated from the following detailed description.

BRIEF DESCRIPTION OF THE DRAWINGS

FIG. 5 is a table containing valve control sequences for pumping and motoring a working fluid through the pumping/motoring sequence of FIG. 4 using a fluid control valve system of the type represented in FIG. 3.

DETAILED DESCRIPTION OF THE INVENTION

Figure 1A:
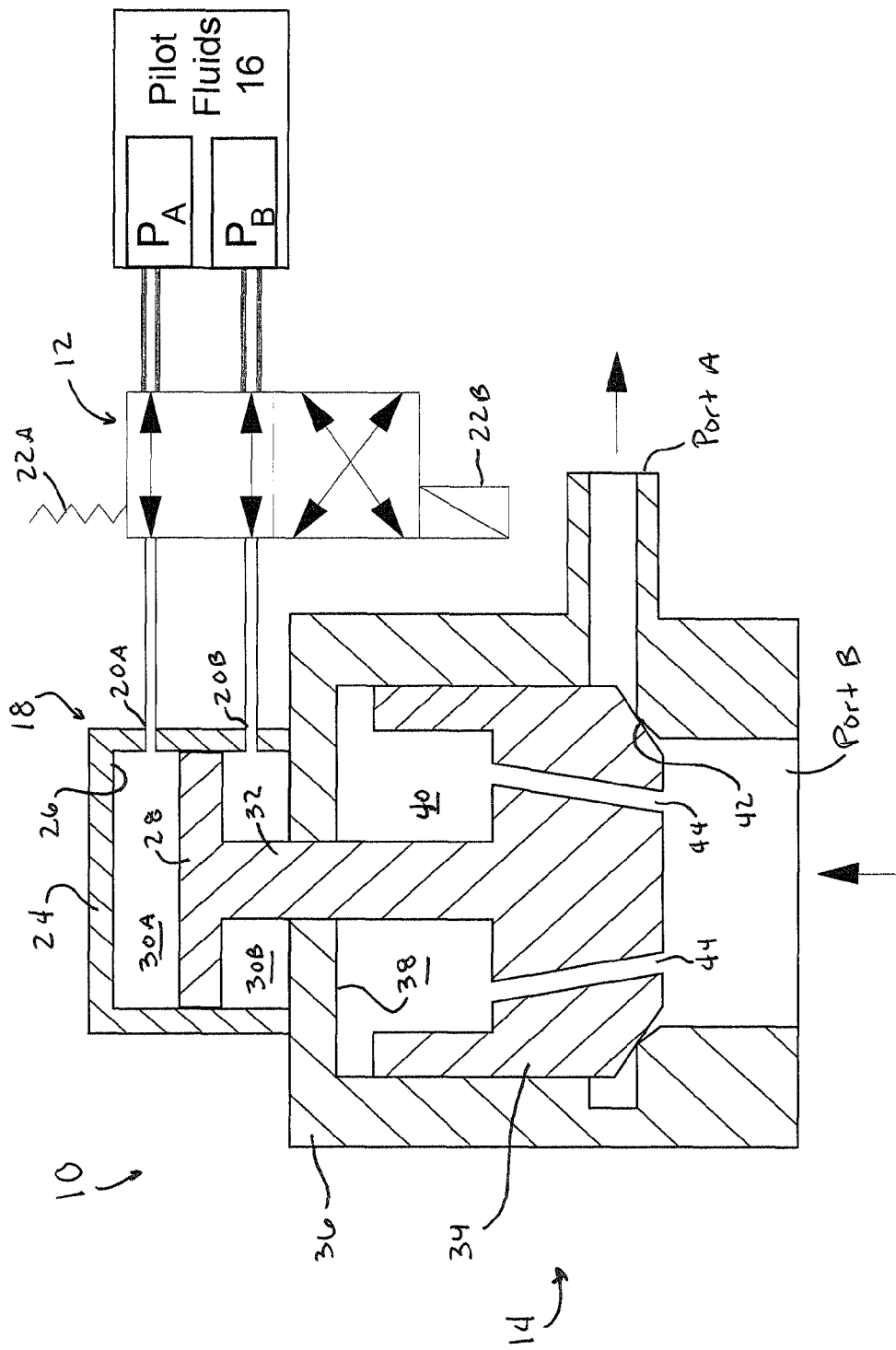
FIGS. 1A and 1B schematically represent a fluid control valve system comprising a bidirectional check valve assembly, a pilot valve assembly and a control valve assembly in accordance with an embodiment of this invention, wherein the fluid control valve system is represented in FIGS. 1A and 1B as being configured to check flow in two different directions through the bidirectional check valve assembly.
Figure 1B:
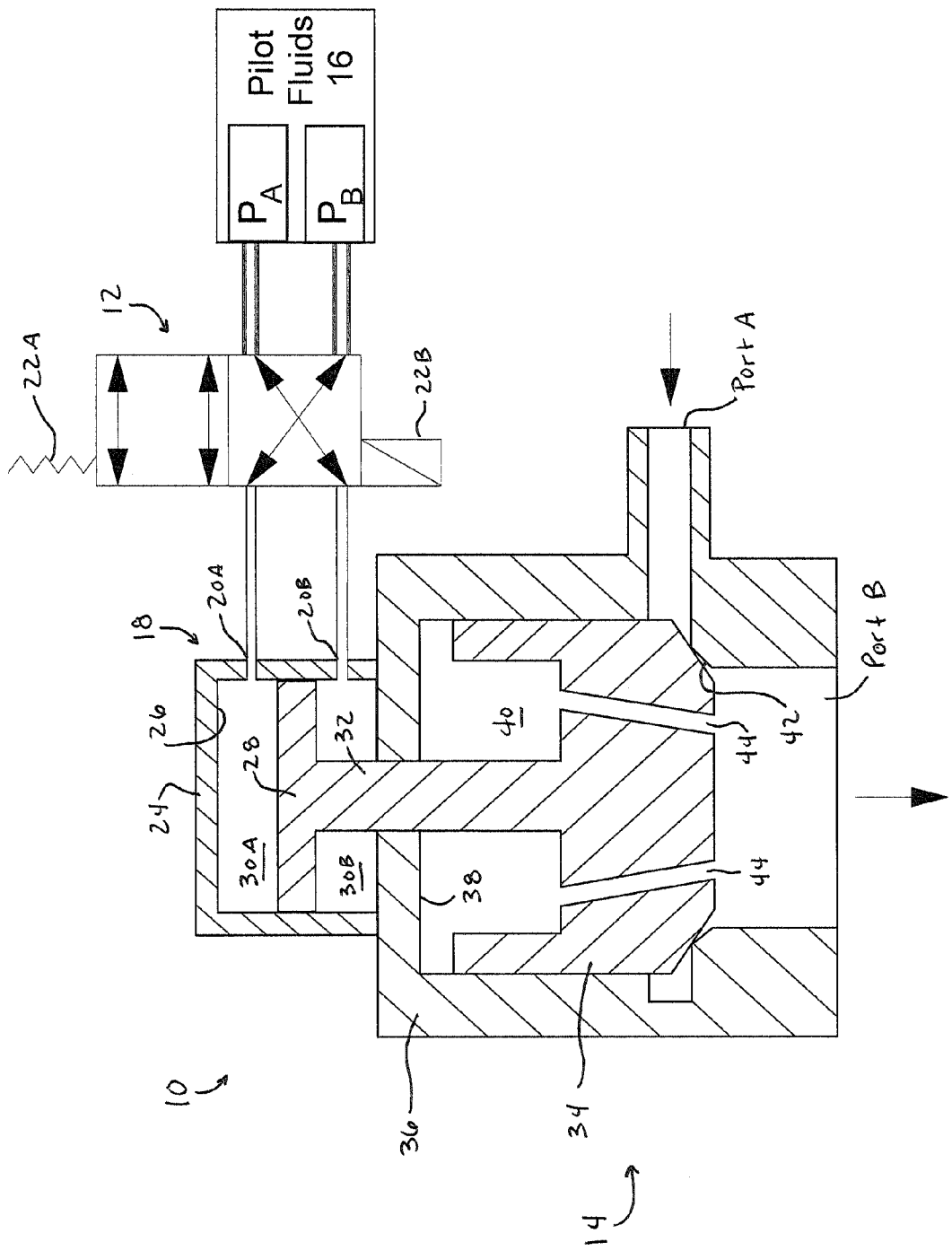

FIGS. 1A and 1B schematically represent a fluid control valve system 10 according to a first embodiment of the invention. The valve system 10 is indicated as including first and second stages. The first stage contains a control valve assembly 12 that directs flow/pressure of pilot fluids 16 to the second stage, represented in FIGS. 1A and 1B as including a poppet-style check valve assembly 14. The pilot fluids 16 may be a single fluid or multiple different fluids at different pressures ($P_A$, $P_B$), and can be drawn from various sources, for example, external sources, servo sources, internal sources, and/or working chambers of pumps and/or motors. A particular but nonlimiting example is a cylinder piston chamber of a pump/motor, as will be discussed below in reference to FIGS. 3 through 5.

The control valve assembly 12 is represented in FIGS. 1A and 1B as a two-position four-way valve assembly, though it will be appreciated that other types of control valves can be used to provide the desired functional aspects of the valve assembly 12. As also represented in FIGS. 1A and 1B, actuation of the control valve assembly 12 can be achieved through the use of an opposing pair of actuating devices 22A and 22B, represented in FIGS. 1A and 1B as a spring 22A (or other mechanical device) and solenoid 22B (or other electromechanical device), though other combinations of actuation techniques are foreseeable, including various combinations of mechanical, electro-mechanical, hydraulic, etc., devices. As will become evident from the following discussion, at least one of the actuating devices 22A and 22B is preferably capable of being electrically controlled, in which case the actuating device is preferably an electromechanical actuator, for example, a solenoid (electromagnet) as represented in FIGS. 1A and 1B, or a piezoelectric actuator, a Lorentz actuator, a rotary to linear actuator, a magnetostrictive actuator, an electrostatic actuator, etc. However, it is foreseeable that the operation of the control valve assembly 12 could be achieved by mechanical or hydraulic means.

The control valve assembly 12 is represented in FIGS. 1A and 1B as being adapted to deliver the pilot fluids 16 to two pilot ports 20A and 20B on a pilot housing 24 of a pilot valve assembly 18. The pilot housing 24 defines a pilot piston chamber 26 that contains a pilot piston 28, which defines two separate pilot chambers 30A and 30B within the chamber 26. The piston 28 is adapted to axially reciprocate within the chamber 26 under the influence of the pilot fluids 16 delivered by the control valve assembly 12. The piston 28 is attached to a pilot stem 32 that is mechanically coupled to a poppet 34 of the check valve assembly 14. The check valve assembly 14 includes a housing 36 that defines an interior 38 in which the poppet 34 is disposed for axial movement therein. The poppet 34 defines a check valve chamber 40 within the check valve housing 36. While FIGS. 1A and 1B represent the check valve assembly 14 as making use of a poppet 34, other types of movable members are foreseeable and could be used.

The poppet 34 is shown in FIGS. 1A and 1B as disposed in a closed position, which refers to the poppet 34 obstructing flow of a working fluid through the check valve assembly 14 as a result of the poppet 34 closing against a valve seat 42 defined by the interior 38 of the check valve housing 36. In accordance with known operating modes of check valves, a working fluid under a sufficient pressure is capable of forcing the poppet 34 off the valve seat 42 (not shown), which permits the working fluid to flow through the check valve assembly 14. In the embodiment of FIGS. 1A and 1B, flow of a working fluid through the check valve assembly 14 is between a pair of fluid ports A and B of the check valve housing 36. The working fluid may enter and exit the check valve housing 36 through either fluid port A and B, which become fluidically connected via the interior 38 of the check valve housing 36 when the poppet 34 is moved from its closed position. Otherwise, the fluid ports A and B are fluidically isolated from each other by the poppet 34 while the poppet 34 remains seated against the valve seat 42 in the closed position. As used herein, it should be understood that the term "isolated" allows for unintentional leakage between the poppet 34 and its seat 42.

According to a preferred aspect of the invention, the control valve assembly 12 of the valve system 10 is operable to control the pressure of the pilot fluids 16 within the pilot chambers 30A and 30B of the pilot valve assembly 18, which in turn operates to enable the check valve assembly 14 to selectively check flow of a working fluid flowing from the port A to the port B, as well as check flow of a working fluid flowing from the port B to the port A. The control valve assembly 12 performs this task by determining the pressures ($P_A$, $P_B$) within the pilot chambers 30A and 30B, thereby controlling the cracking pressures at which the poppet 34 will lift off its seat 42. As well understood in the art, the effective areas of the pilot piston 28 and poppet 34 have a direct affect on the cracking pressures of the poppet 34. In the embodiment of FIGS. 1A and 1B, the effective surface area of the piston 28 within the pilot chamber 30A is greater than the effective surface area of the piston 28 within the pilot chamber 30B due to the presence of the stem 32. Similarly, the effective surface area of the poppet 34 within the check valve chamber 40 is less than the effective surface area of the poppet 34 opposite the chamber 40 due to the presence of the stem 32. However, the effective surface area of the poppet 34 also depends on whether the poppet 34 is in its closed or open position. In the open position (not shown), the entire lower surface of the poppet 34 is exposed to the pressure of the working fluid that is flowing through the check valve housing 36 between the ports A and B. In the embodiment of FIGS. 1A and 1B, this working fluid pressure is also transmitted through one or more passageways 44 in the poppet 34 to the chamber 40 within the check valve housing 36, with the result that, once off its seat 42, the poppet 34 tends to stay in its open position until a sufficient counteracting force returns it to its seat 42.

In the closed position shown in FIGS. 1A and 1B, only a central portion of the lower surface of the poppet 34 is exposed to the pressure of the working fluid at port B, and only a peripheral portion of the lower surface of the poppet 34 is exposed to the pressure of the working fluid at port A. Consequently, in the event that working fluid is pressurized at port B (FIG. 1A), the force generated by the working fluid at the lower surface of the poppet 34 is not likely to be sufficient by itself to counteract the force generated by the working fluid within the chamber 40, and the poppet 34 will not lift off its seat 42 unless the pilot valve assembly 18 provides sufficient assistance. Likewise, in the event that the working fluid is pressurized at port A (FIG. 1B), the force generated by the working fluid at the peripheral surface of the poppet 34 may not be sufficient to counteract the force generated by the working fluid within the chamber 40, such that the poppet 34 will not lift off its seat 42 unless the pilot valve assembly 18 provides sufficient assistance.

In view of the above, one aspect of the invention is that the control valve assembly 12 can be operated to deliver pilot fluids 16 at different pressures ($P_A$, $P_B$) that are sufficient to enable the poppet 34 to be opened in response to a working fluid pressurized at either port A or B, which provides the valve system 10 with a bidirectional flow capability through the check valve assembly 14. In the embodiment of FIGS. 1A and 1B, this capability is shown as being achieved by operating the control valve assembly 12 to switch the pressures ($P_A$, $P_B$) of the pilot fluids 16 delivered to the pilot ports 20A and 20B of the pilot valve assembly 18. More particularly, the control valve assembly 12 of FIGS. 1A and 1B can be controlled by electrically controlling (energizing and de-energizing) the solenoid 22B of the valve assembly 12. Through the operation of the control valve assembly 12, the bidirectional check valve assembly 14 is an "active check valve," in which the control valve assembly 12 can be used to electronically alter the flow direction for which the check valve assembly 14 acts as a check valve. As will be discussed below, such a capability has tremendous value in various applications, for example, pump/motors because the valve system 10 enables a four-quadrant pump/motor operation that is not possible with conventional passive or active check valves.

For optimal operation of the valve system 10, the control valve assembly 12 should utilize relatively small components to enable the valve assembly 12 to respond quickly and/or use minimal energy to actuate. Notably, the valve assembly 12 does not require a high flow capacity for the purpose of controlling the check and pilot valve assemblies 14 and 18, though should preferably be capable of relatively high acceleration levels at the poppet 34. The flow capacity of the check valve assembly 14 should be sufficiently large to accommodate higher flows typically associated with applications for check valves. Additionally, the functional relationship between the control, check and pilot valve assemblies 12, 14 and 18 controls the position of the poppet 34, which can simplify the control algorithms used to control the control valve assembly 12 (for example, through its solenoid 22B) and reduce sensitivity to control algorithm timing. It should be further noted that the valve system 10 can be operated passively by simply not using any active electronic control of the control valve assembly 12, with the result that the check valve assembly 14 could be operated to have a one-directional check valve mode as a result of the bias force applied by the spring 22A (or other suitable biasing technique, for example, fluid pressure, permanent magnet, etc.).

Figure 2:
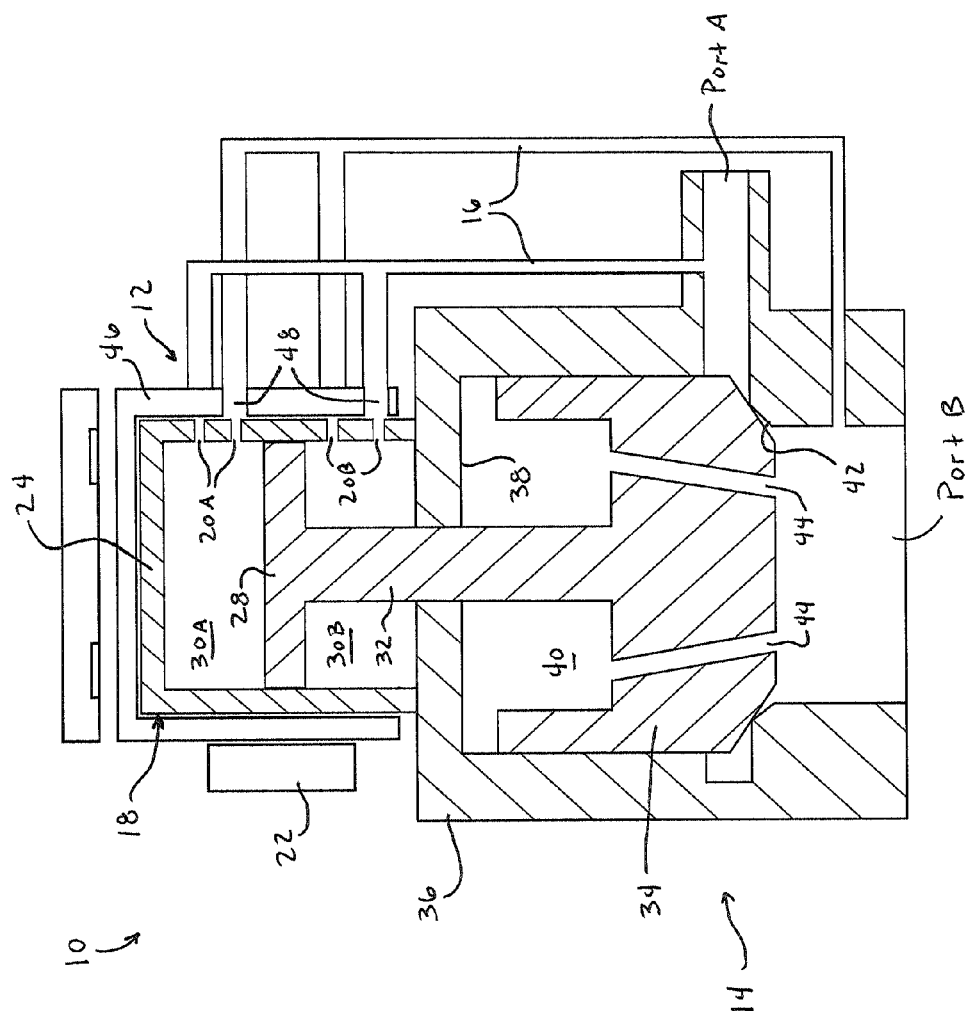
FIG. 2 schematically represents a fluid control valve system that is operatively similar to the valve system of FIGS. 1A and 1B, but in which the bidirectional check valve has an integrated pilot valve assembly in accordance with another embodiment of this invention.

FIG. 2 represents an embodiment of the valve system 10 that is similar to that of FIGS. 1A and 1B, but with the control valve assembly 12 integrated with the pilot valve assembly 18 on the check valve assembly 14. For convenience, identical reference numerals are used in FIG. 2 to denote the same or functionally equivalent elements described for the embodiment of FIGS. 1A and 1B. In FIG. 2, the control valve assembly 14 comprises a moveable piece 46 that surrounds the pilot housing 24 and is equipped with ports 48 that can be selectively aligned with the ports 20A and 20B of the pilot chambers 30A and 30B. A mechanical or electro-mechanical actuator 22 can be used to actuate the piece 46 and position its ports 48 relative to the pilot ports 20A and 20B for the purpose of delivering the desired pilot fluid pressure to the appropriate pilot chamber 30A and 30B. From FIG. 2, it can be appreciated that the pilot piston 28 could be actuated electromagnetically by configuring the piston 28 as an armature to a stator defined by the moveable piece 46 in which case fluid connections from sources of one or more pilot fluids 16 to the control valve assembly 12 would be unnecessary. Other aspects of the embodiment of FIG. 2 will not discussed in any detail here, but can be, in terms of structure, function, materials, etc., essentially as was described for the embodiment of FIGS. 1A and 1B.

Figure 3:
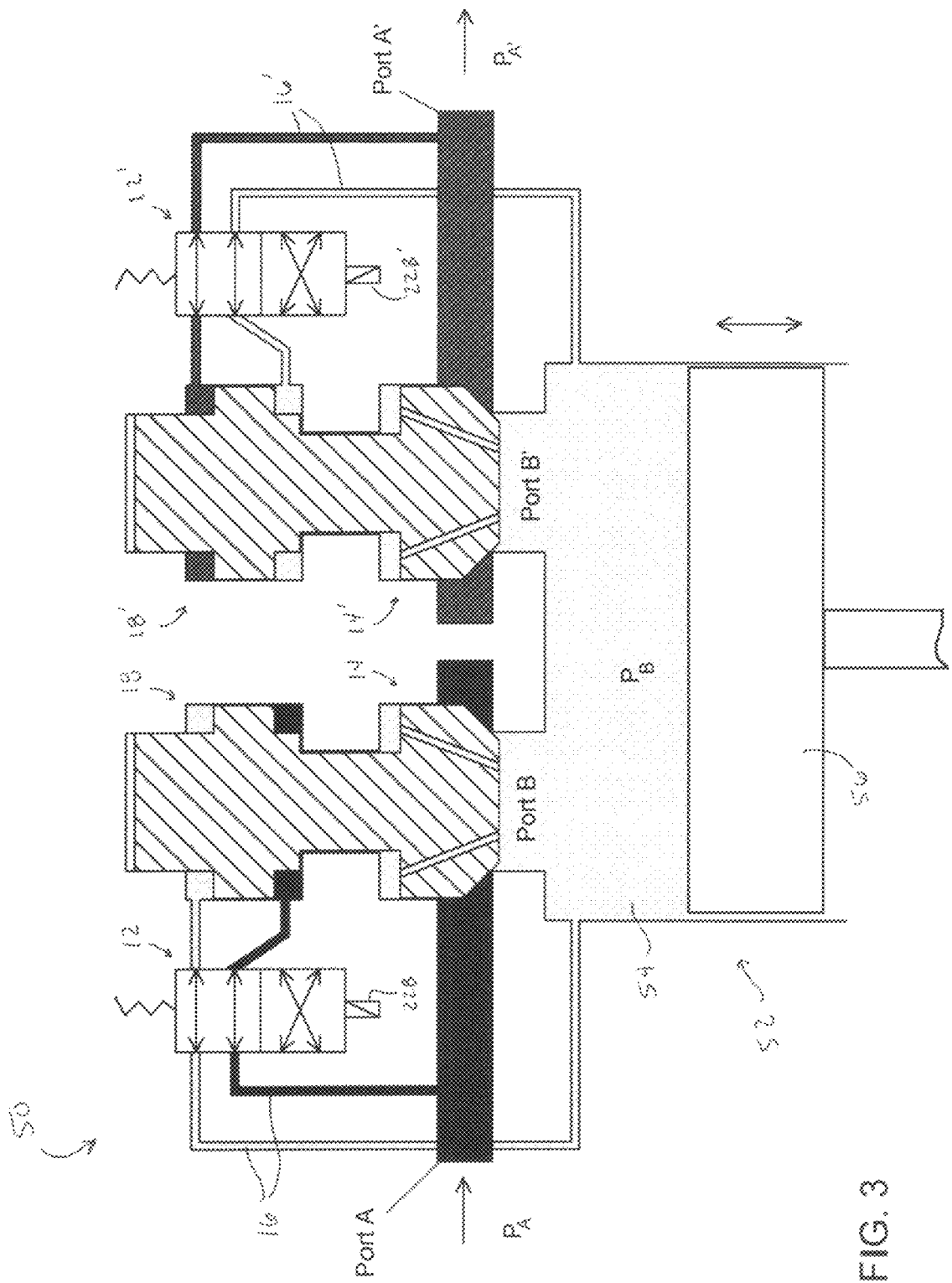
FIG. 3 schematically represents a fluid control valve system comprising a pair of bidirectional check valve assemblies, each equipped with a dedicated pilot valve assembly and control valve assembly and each installed on a working chamber of a pump/motor.

FIG. 2 further differs from the embodiment of FIGS. 1A and 1B by representing the sources of the pilot fluids 16 as the working fluid at ports A and B of the check valve housing 36. This approach can be advantageously applied to a variety of applications for check valves, including the control of pumps and motors, a nonlimiting example of which is represented in FIG. 3. As with FIG. 2, identical reference numerals are used in FIG. 3 to denote the same or functionally equivalent elements described for the embodiment of FIGS. 1A and 1B. However, the valve system 10 of FIG. 3 comprises a pair of bidirectional check valve assemblies, each equipped with a dedicated pilot valve assembly and control valve assembly. Therefore, for purposes of clarity, components within the portion of the valve system 10 on the righthand side of FIG. 3 will be further identified with the prime symbol (').

In the representation of FIG. 3, a fluid system 50 is shown that includes the valve system 10 and a pump/motor 52 (of which only a fragment is shown). A working fluid enters and exits the valve system 10 through ports A and A', while the working fluid enters and exits a cylinder chamber 54 of the pump/motor 52 through ports B and B'. Depending on the operating mode (pump or motor) and the flow direction of the working fluid, ports A or A' may be connected to a source of the working fluid, a process or other destination at which the working fluid has been used or is to be used, or some intermediate process or destination. The pressures at ports A and A' are identified as $P_A$ and $P_A'$, respectively, while the pressure within the chamber 54 corresponds to the pressure identified in FIGS. 1A, 1B and 2 as $P_B$.

As evident from FIG. 3, one of the pilot fluids 16 utilized by the pilot valve assembly 18 is drawn from the working fluid at port A, and the other pilot fluid 16 utilized by the pilot valve assembly 18 is drawn from the working fluid within the chamber 54, effectively port B of the check valve assembly 12. Similarly, the pilot fluids 16' utilized by the pilot valve assembly 18' are drawn from the working fluid at ports A' and B'. If the pump/motor 52 is operating in pump mode, the working fluid will be at a lower pressure at port A ($P_A$) than at port A' ($P_A'$), while the reverse will be true if the pump/motor 52 is operating in motor mode. In both cases, the pressure ($P_B$) at ports B and B' of the chamber 54 will depend on the action of a piston 56 within the chamber 54 on the working fluid. The control valve assembly 12 is electrically controlled to selectively supply the pilot fluids 16 at either pressure $P_A$ or $P_B$ to the pilot chambers 30A and 30B of its associated pilot valve assembly 18, and the control valve assembly 12' is electrically controlled to selectively supply the pilot fluids 16' at either pressure $P_A'$ or $P_B$ to the pilot chambers 30A' and 30B' of its associated pilot valve assembly 18'.

Figure 4:
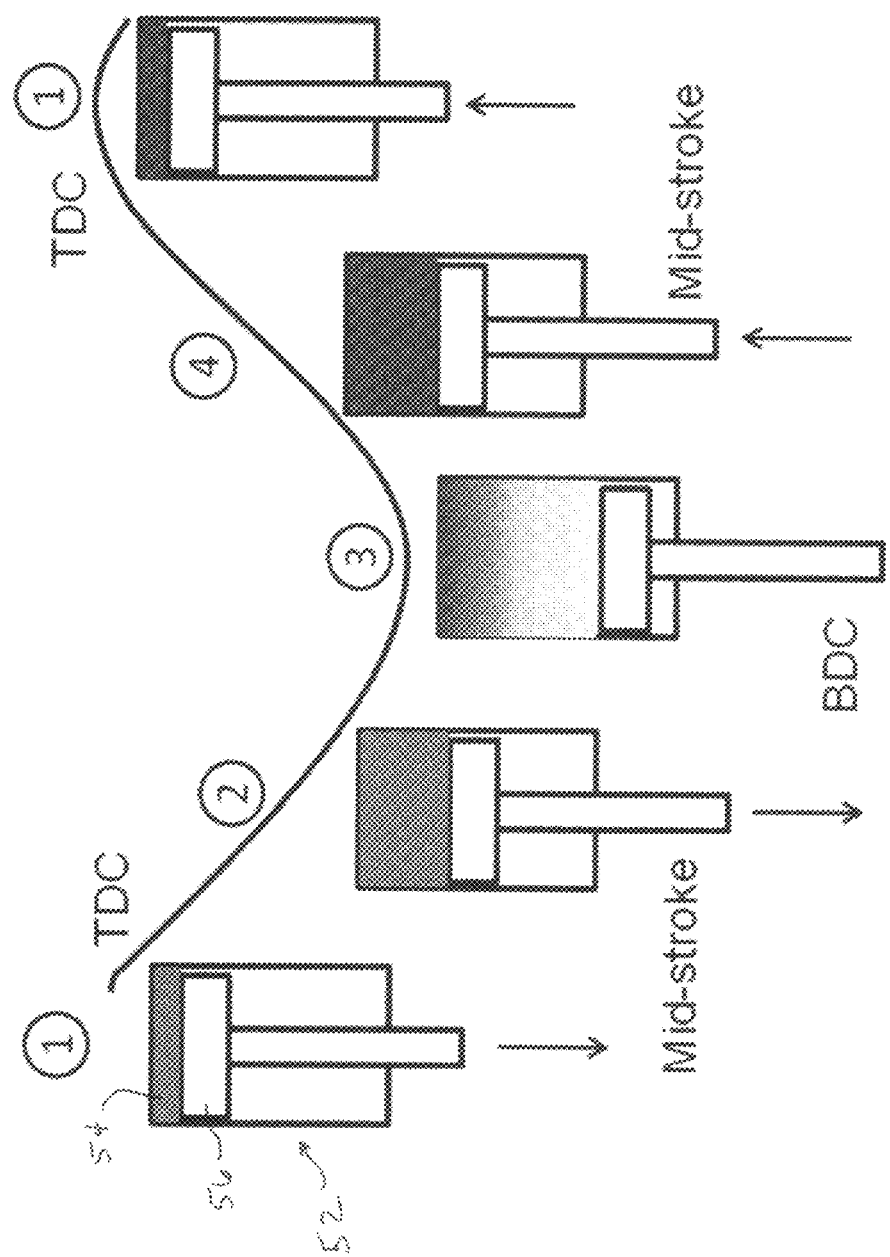
FIG. 4 schematically represents a pumping/motoring sequence for the working chamber of the pump/motor of FIG. 3.

Advantageously, by appropriately controlling the control valve assemblies 12 and 12', the pump/motor 52 can be operated as a variable-displacement digital pump/motor by enabling each check valve assembly 14 and 14' to operate bidirectionally. More particularly, each check valve assembly 14 and 14' can be controlled to selectively check flow of the working fluid flowing from its associated port A or port A' to the working chamber 54 of the pump/motor 52, or check flow of the working fluid flowing from the working chamber 54 of the pump/motor 52 to its associated port A or port A'. This aspect of the invention can be appreciated in reference to FIGS. 4 and 5. FIG. 4 depicts a pumping/motoring sequence for the chamber 54 and its piston 56 (together constituting a cylinder of the pump/motor 52), including a position "1" that corresponds to the top dead center (TDC) position of the piston 56, and a position "3" that corresponds to the bottom dead center (BDC) position of the piston 56. FIG. 5 contains a table that identifies the operating states of the solenoids 22B and 22B' of the control valve assemblies 12 and 12' as "off" (de-energized solenoid) or "on" (energized solenoid) for the purpose of achieving displacements of 0%, 50% and 100% for pumping and motoring modes of the chamber 54. The pressures at ports A and A' are denoted as either a relatively high pressure (HP) or a relatively low pressure (LP), corresponding to whether the pump/motor 52 is operating in the pumping or motoring mode. The relationship of the pressures at ports A and A' is important to the operating strategy of the pump/motor 52, but not the actual pressures at the ports A and A'. Furthermore, though FIG. 5 only identifies three discrete displacements (0%, 50%, 100%), an infinite number of displacements can be achieved by varying the timing of the control valve assemblies 12 and 12' relative to position of the piston 56.

As an initial point, it should be noted that both solenoids 22B and 22B' are "off" (de-energized) throughout the pumping cycle to achieve 100% displacement when pumping from port A to port A', in which case the valve system 10 operates similarly to a passive check ball pump. However, the control valve assemblies 12 and 12' can be controlled through their solenoids 22B and 22B' to dynamically control displacement during the pumping cycle, as evident from FIG. 5. As an example, FIG. 5 shows that to achieve 50% pumping displacement, the solenoid 22B is "off" at positions 1 and 2, turned "on" at position 3, and then turned "off" at position 4 (corresponding to the positions 1 through 4 identified in FIG. 4). It should be noted that the indicated positions of the piston 56 represent that the solenoid 22B or 22B' of a control valve assembly 12 or 12' will be switched at the indicated position. For example, where the solenoid 22B is identified as being "off" at position 2, the solenoid 22B is switched "off" at that piston position, and the state of the solenoid 22B does not change unless indicated by the next piston position.

Figure 6A:
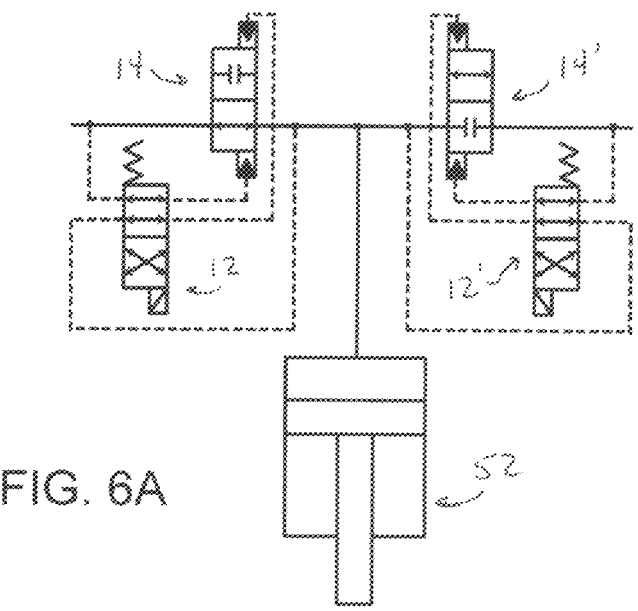
FIGS. 6A through 6E represent fluid schematics of bidirectional check valve assemblies in accordance with various embodiments of this invention.
Figure 6B:
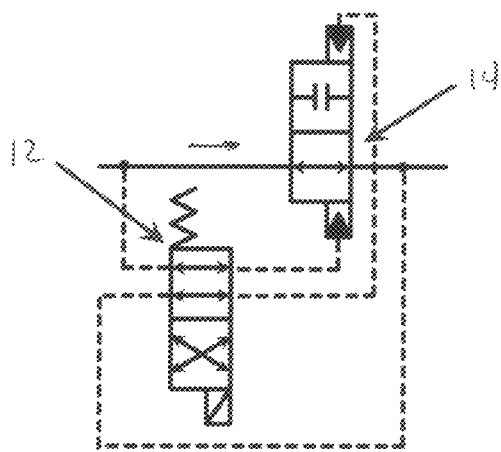
Figure 6C:
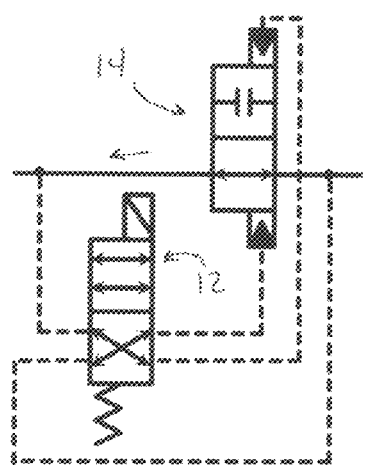
Figure 6D:
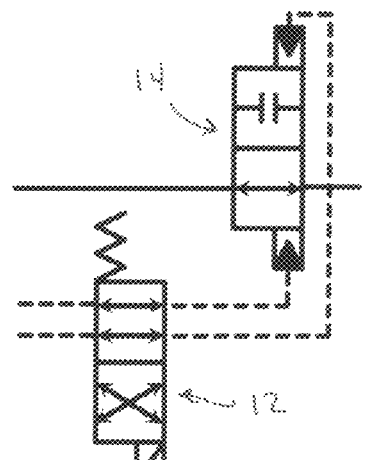
Figure 6E:
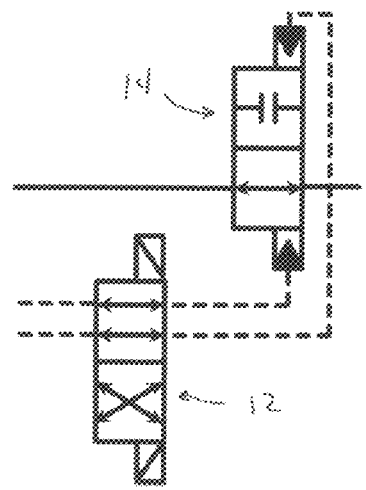

FIGS. 6A through 6E represent five nonlimiting examples of schematic representations of valve systems 10 with bidirectional check valve operations within the scope of the invention. FIG. 6A represents that configuration of the valve system 10 and pump/motor 52 of FIG. 3. FIGS. 6B and 6C are schematic representations of valve systems 10 containing a single bidirectional check valve assembly 14 based on the configuration of FIGS. 1A and 1B, with the representations of FIGS. 6B and 6C differing by having a left-to-right (FIG. 6B) or right-to-left (FIG. 6C) flow direction when the solenoid 22B is de-energized. In FIG. 6D, the control valve assembly 12 obtains the pilot fluids 16 from external sources, and in FIG. 6E control of the control valve assembly 12 is entirely electro-mechanical.

Figure 7:
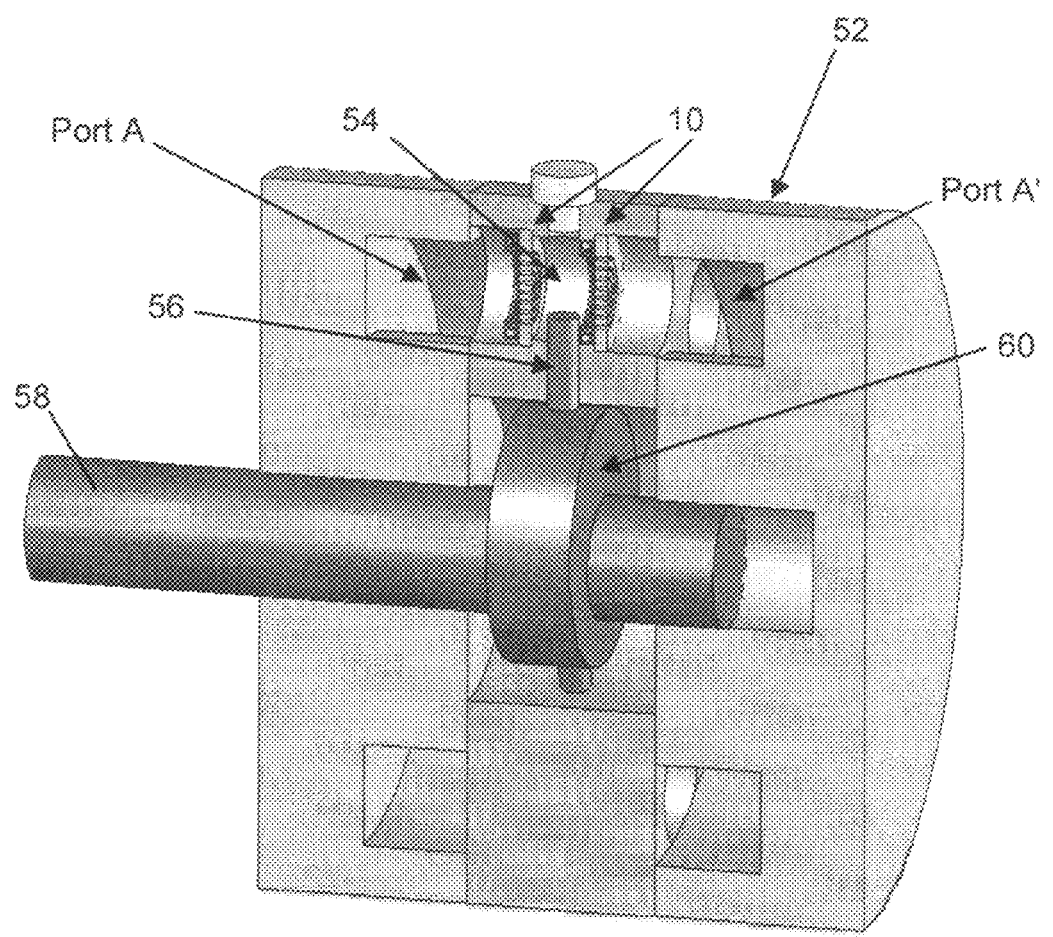
FIG. 7 schematically represents a physical embodiment of a pump/motor equipped with a fluid control valve system in accordance with an embodiment of this invention.

From FIGS. 3 through 5, it can be appreciated that a primary application for the valve system 10 would be a digital pump/motor having a variable displacement capability, though there are likely other applications that would benefit from a high-speed high-flow bidirectional check valve capability. FIG. 7 schematically represents a nonlimiting example of a physical embodiment for a pump/motor 52 equipped with a fluid control valve system 10 within the scope of this invention. The pump/motor 52 has a radial configuration, although axial pistons, in-line pistons, and other piston configurations can be used. The valve system 10 replaces a valve plate that would be conventionally provided with a pump/motor of the type represented in FIG. 7, with the result that the pump/motor 52 is capable of a more efficient operation.

With further reference to FIG. 7, the digital pump/motor 52 is capable of operating as a pump or a motor with flow in either direction. Rotation of a cam shaft 58 that operates the piston 56 through a cam 60 can be in either direction, and relatively high and low pressures can be applied to either port A or A'. As the pump/motor shaft 58 rotates and the piston 56 moves upward/downward, either check valve assembly 14 at the high pressure or low pressure port A or A' can be opened to accept or reject a working fluid from the connected port A or A'. In accordance with the prior discussion of FIGS. 3, 4 and 5, the operation of each check valve assembly (not labeled) of the valve system 10 can be switched with its associated control valve assembly (not labeled) during the middle of the piston stroke to change which port A or A' is connected to the chamber 54. By controlling the timing of the valve system 10, the amount of working fluid accepted from or rejected to each port A and A' can be actively controlled. While the pump/motor shaft 59 rotates, either bidirectional check valve assembly can be opened against high pressure by operating the control valve assembly to switching the higher and lower pressures applied to the pilot valve assembly (not labeled).

During operation of the pump/motor 52 as a pump, the check valve assembly connected to the port (for example, port A) supplied with the lower pressure can be closed during the upstroke of the piston 56, causing the chamber 54 to be pressurized. Once the pressure within the chamber 54 is approximately equal to the pressure of the high pressure port (for example, port A'), the check valve assembly connected to the high pressure port A' can be opened (actively or passively). During downstroke of the piston 56, the check valve assembly connected to the high pressure port A' can be closed, causing the chamber 54 to decompress. Once the pressure within the chamber 54 is approximately equal to the pressure of the low pressure port A, the check valve assembly connected to the low pressure port A can be opened (actively or passively).

The pump/motor 52 and its valve system 10 can be timed to effectively control displacement, in other words, the amount of working fluid volumetrically displaced per revolution of the cam shaft 58, which in turn affects other parameters, such as flow, torque, power, etc. Displacement of the pump/motor 52 can be controlled through the operation of the control valve assembly 12 alone or in combination with other methods. For example, the total stroke of the piston 56 can be adjusted similarly to the manner in which displacement is controlled in existing piston machines, such as by adjusting a swash plate angle on an axial piston machine or adjusting the eccentricity of a radial piston machine.

With the active bidirectional check valve capability of this invention, flow diversion within the pump/motor 52 can be achieved by drawing and returning the working fluid from the same port A or A' to idle the operation of a cylinder (chamber 54 and piston 56) on both low pressure or high pressure sides of the pump/motor 52. A cylinder can be completely deactivated by returning the entire volume of working fluid to the same port A/A' from which it was drawn. Alternatively fluid can be drawn from one or both ports A and A' and returned to one or both ports A/A'. For instance a cylinder can be partially deactivated by drawing a full chamber 54 of working fluid from port A, pumping some of the working fluid back to port A, and pumping the remaining portion of fluid to port A'. Alternatively working fluid can be drawn from ports A and A', and then completely pumped to port A.

In order to deactivate the cylinder of the pump/motor 52, it is also possible to void the working fluid. For example if the piston 56 is at top dead center (TDC; position 1 in FIG. 4), the check valve assemblies can be closed as the piston 56 travels downward (position 2 in FIG. 4), such that voiding ("cavitation") occurs within the chamber 54. The piston 56 reaches bottom dead center (BDC; position 3 in FIG. 4) and then continues to travel upward (position 4 in FIG. 4). Because the check valve assemblies remain closed throughout this cycle, no working fluid is pumped through either check valve assembly or its port A or A'. This control strategy has the advantage that it may have lower energy losses, generate less noise during operation, and be capable of operating at cold temperature with high viscosity working fluids. With the control valve assembly 12, it is possible for the cylinder to be only partially deactivated by using cavitation with this technique.

For example, the check valve assemblies may be controlled so that the piston 56 draws in a partial volume of fluid from port A as it moves downward from TDC (to/through position 2 of FIG. 4), after which both check valve assemblies can be shut as the piston 56 continues to move downward toward BDC (position 3 of FIG. 4), creating a void. Following BDC, as the piston 56 moves upward the void would collapse and the piston 56 would make contact with the working fluid, after which the check valve assembly to port A' could be opened (either actively or by pressure) to discharge the working fluid to port A'. This voiding strategy can be used in both pumping and motoring modes and for partial or full cylinder deactivation.

In the event that the digital pump/motor 52 is to be operated as a motor that will come to a complete stop, the inclusion of the valve system 10 and its bidirectional check valve assembly 14 provide distinct advantages over other types of passive and active check valves. The control valve assembly 12 can deliver sufficiently pressures to the pilot valve assembly 18 that enable the poppet 34 of the check valve assembly 14 to open against high pressure, a capability not possible with conventional active check valves. Such a capability enables self-starting of the pump/motor 52 (and other pump/motors equipped with a valve system 10 of this invention) when operating in motoring mode, as would be required on a hydraulic hybrid vehicle.

Pump/motors equipped with a valve system 10 of this invention can also benefit from the ability to control parameters of the pump/motor. Existing commercial pumps commonly control various parameters such as pressure, flow, displacement, power, torque, and speed. A digital pump/motor equipped with a valve system 10 of this invention has the ability to control a check valve assembly in a number of ways to control these parameters as well as other parameters that may be of interest, for example, noise (fluid and structure borne), pressure ripple, flow ripple, torque ripple, acceleration, and so on. Such parameters and others can be controlled based on intended application by simply altering the control algorithm of the control valve assembly 12. It may be possible to simultaneously control several parameters using, for example, selection logic or weighting factors in the control algorithm. It is important to note that, due to the capability of providing completely independent timing control of individual check valve assemblies 14 with dedicated control valve assemblies 12, it is possible to control both average and instantaneous parameters of a pump/motor.

Various different sensors may be used as inputs to a controller used to control a valve system 10 of this invention and the operation of a pump/motor on which it is installed. Examples of notable inputs include shaft rotational position, shaft rotational velocity, shaft rotational acceleration, case linear acceleration (vibration), load position/velocity/acceleration (rotary or linear), noise, port pressures, cylinder pressures, shaft torque, power, mechanical displacement (i.e., swash plate angle or eccentricity), fluid temperature, fluid viscosity, and valve position. Additional sensors and inputs could be conceivably employed as controller inputs, depending on the particular application.

Other possibilities that may be enabled by the present invention include the intentional avoidance of relatively consistent actuation or filling of the chamber 54, and instead actuating the check valve assemblies with a semi-random timing scheme to create a white noise harmonic to reduce noise and vibration. The valves could also be timed to avoid certain harmonics, for example, the resonant frequency of the load on the pump/motor. For example, if 40% displacement output is desired for a pump/motor with five cylinders (chamber/piston combinations), each pair of check valve assemblies for each cylinder could be controlled such that each cylinder pumped/motored 40% and idled the remaining 60% of each pump/motor stroke. Alternatively, a 40% displacement output for the pump/motor could be achieved by operating two cylinders and idling the remaining three cylinders during each cycle. Still another approach to achieve 40% displacement output from a pump/motor is to operate the check valve assemblies 14 to achieve random displacements whose average is 40% to create "white noise" flow/pressure ripple.

Finally, while certain types of pump/motors are discussed above and/or are represented in the Figures, the invention is more generally applicable to categories of pump/motors that can be adapted to use check valves to control the flow of working fluid to and from their chambers in which work is performed on or extracted from the working fluid. The preceding discussion is generally directed to an active four-quadrant check valve pump/motor that makes use of a valve system 10 that includes a pair of bidirectional check valve assemblies 14 located at the inlet/outlet ports of each pumping cylinder, generally as represented in FIG. 3. More generally, valve systems 10 of this invention can be installed and operated on a variety of passive and active check valve pumps. A passive check valve pump can be achieved by not applying any control of the control valve assembly 12, and instead allowing a built-in bias (spring 22A, etc.) of the valve assembly 10 to maintain a constant operation of the valve assembly 12. However, the installation of a valve system 10 in this manner results in a pump/motor that is only capable of pumping (not motoring) a working fluid at maximum displacement, unless the piston stroke can be changed through some type of adjustment, for example, eccentricity or swash plate angle. An active check valve pump can be created with a valve system 10 of this invention by installing a conventional passive check valve at one port of each cylinder of the pump (or operating a check valve assembly 14 of this invention in a passive mode as described above), and installing and operating a valve system 10 at the remaining port of each pump cylinder. Such a pump would only have the ability to pump (not motor), though the displacement of the pump can be controlled by electronic timing of the check valve assemblies 14 to fully or partially idle the cylinders.

Digital pump/motors of the types described above can be used in a variety of existing fluid power applications using pumps and/or motors, such as on-highway and off-highway vehicles (for example, to operate actuators, transmissions, fan drives, etc.), industrial applications, and generally any fluid pumping machine. Features and aspects of the invention may further enable additional applications where fluid power is typically not used, such as electrical generator transmissions (for example, windmills, dams/hydroelectric, tidal, generator sets), hybrid vehicles (for example, series, parallel, or power split), displacement-controlled actuation systems, or systems that require high bandwidth pump/motor control.

In view of the above, though the invention has been described in terms of specific embodiments, it is should be apparent that other forms could be adopted by one skilled in the art. For example, the physical configuration of a valve system, its components, and a pump or motor on which it is installed could differ from those shown in the Figures, and various materials and processes could be used in their construction. Therefore, the scope of the invention is to be limited only by the following claims.

The invention claimed is:

1. A method of operating a fluid control valve system comprising a bi-directional check valve assembly having a movable member that is movable with a pilot valve assembly between a closed position that checks flow of a working fluid through the bi-directional check valve assembly and an open position that allows the working fluid to flow through the bi-directional check valve assembly between first and second fluid ports thereof, the method comprising:

controlling a pressure of at least one pilot fluid within the pilot valve assembly to enable the movable member of the bi-directional check valve assembly to selectively check flow of the working fluid flowing from the first fluid port to the second fluid port or check flow of the working fluid flowing from the second fluid port to the first fluid port;

selectively supplying the at least one pilot fluid at a first pressure to a first pilot chamber of the pilot valve assembly and supplying the at least one pilot fluid at a second pressure to a second pilot chamber of the pilot valve assembly to check flow of the working fluid flowing from the first fluid port to the second fluid port while the movable member of the bi-directional check valve assembly is in the closed position; and selectively supplying the at least one pilot fluid at the second pressure to the first pilot chamber of the pilot valve assembly and supplying the at least one pilot fluid at the first pressure to the second pilot chamber of the pilot valve assembly to check flow of the working fluid flowing from the second fluid port to the first fluid port while the movable member of the bi-directional check valve assembly is in the closed position thereof.

2. The method according to claim 1, wherein the at least one pilot fluid at the first and second pressures are portions of the working fluid at the first and second fluid ports of the check valve assembly.

3. The method according to claim 2, further comprising operating the fluid control valve system to control the movable member of the bi-directional check valve assembly to selectively check flow of the working fluid into or out of a working chamber of a pump/motor.

4. The method according to claim 3, the method comprising controlling the movable member of the bi-directional check valve assembly to dynamically adjust displacement of the working fluid flowing into or out of the working chamber during a pumping or motoring cycle of the pump/motor.

5. A fluid control valve system comprising:

a bi-directional check valve assembly that checks flow in two directions, the bi-directional check valve assembly comprising a check valve housing and a movable member disposed within an interior of the check valve housing for axial movement therein, the movable member defining a check valve chamber within the check valve housing, the movable member having an open position and a closed position;

first and second fluid ports coupled to the check valve housing and through which a working fluid enters and exits the check valve housing, the first and second fluid ports being fluidically connected via the interior of the check valve housing when the movable member is in the open position, the first and second fluid ports being fluidically isolated from each other by the movable member when the movable member is in the closed position;

a pilot valve assembly comprising a pilot housing, a pilot piston disposed within an interior of the pilot housing for axial movement therein, and a pilot stem that mechanically couples the pilot piston to the movable member of the bi-directional check valve assembly, the pilot piston defining first and second pilot chambers within the pilot housing;

first and second pilot ports fluidically coupled to the first and second pilot chambers, respectively, of the pilot housing and through which at least one pilot fluid enters and exits the pilot housing; and means for controlling the pressure of the at least one pilot fluid within the first and second pilot chambers of the pilot housing to enable the movable member of the bi-directional check valve assembly to switch between selectively checking flow of the working fluid flowing in a first direction from the first fluid port to the second fluid port and checking flow of the working fluid flowing in a second direction from the second fluid port to the first fluid port, wherein the controlling means is operable to selectively supply the at least one pilot fluid:

at a first pressure to the first pilot chamber of the pilot valve assembly and at a second pressure to the second pilot chamber of the pilot valve assembly to check the flow of the working fluid flowing in the first direction from the first fluid port to the second fluid port while the movable member is in the closed position thereof; and then at the second pressure to the first pilot chamber of the pilot valve assembly and at the first pressure to the second pilot chamber of the pilot valve assembly to check flow of the working fluid flowing in the second direction from the second fluid port to the first fluid port while the movable member is in the closed position thereof.

6. The fluid control valve system according to claim 5, wherein the controlling means comprises a third valve assembly that selectively switches the at least one pilot fluid at the first and second pressures between the first and second pilot chambers.

7. The fluid control valve system according to claim 6, wherein the third valve assembly is a two-position four-way valve assembly.

8. The fluid control valve system according to claim 6, wherein the controlling means further comprises means for electrically controlling whether the third valve assembly selectively switches the at least one pilot fluid at the first and second pressures between the first and second pilot chambers.

9. The fluid control valve system according to claim 5, wherein the at least one pilot fluid at the first and second pressures are portions of the working fluid at the first and second fluid ports of the check valve housing.

10. The fluid control valve system according to claim 5, wherein the bi-directional check valve assembly is a poppet check valve assembly and the movable member is a poppet.

11. The fluid control valve system according to claim 5, wherein the first fluid port of the check valve housing is fluidically connected to a fluid source of a pump/motor and the second fluid port of the check valve housing is fluidically connected to a working chamber of the pump/motor.

12. The fluid control valve system according to claim 11, wherein the controlling means comprises a third valve assembly that selectively switches the at least one pilot fluid at the first and second pressures between the first and second pilot chambers.

13. The fluid control valve system according to claim 12, wherein the at least one pilot fluid at the first pressure is a portion of the working fluid from the fluid source of the pump/motor and the at least one pilot fluid at the second pressure is a portion of the working fluid from the working chamber of the pump/motor.

14. The fluid control valve system according to claim 12, wherein the controlling means further comprises means for electrically controlling whether the third valve assembly selectively switches the at least one pilot fluid at the first and second pressures between the first and second pilot chambers.

15. The fluid control valve system according to claim 14, wherein the controlling means enables the pump/motor to operate as a variable displacement pump/motor by enabling the bi-directional check valve assembly to selectively check flow of the working fluid flowing from the fluid source to the working chamber of the pump/motor or check flow of the working fluid flowing from the working chamber of the pump/motor to the fluid source.

16. A fluid system comprising:
a fluid source of a working fluid;
a pump/motor adapted to pump or motor the working fluid, the pump/motor having a working chamber and first and second working chamber ports through which the working fluid is able to enter and exit the working chamber;
a destination for the working fluid after the working fluid exits the working chamber;
a fluid control valve system fluidically coupled to the first and second working chamber ports of the pump/motor, the fluid control valve system comprising first and second bi-directional check valve assemblies that each have a movable member that checks flow in two directions, a pilot valve assembly comprising a pilot housing and a pilot piston that defines first and second pilot chambers within the pilot housing and a pilot stem that mechanically couples the pilot piston to the movable member thereof, and controlling means for enabling the pump/motor to operate as a variable displacement pump/motor by causing the movable member of the first bi-directional check valve assembly to selectively switch between checking flow of the working fluid flowing from the fluid source to the working chamber of the pump/motor and checking flow of the working fluid flowing from the working chamber of the pump/motor to the fluid source, and causing the movable member of the second bi-directional check valve assembly to selectively switch between checking flow of the working fluid flowing from the working chamber of the pump/motor to the destination and checking flow of the working fluid from the destination to the working chamber of the pump/motor;

wherein the controlling means causes the movable member of each of the first and second bi-directional check valve assemblies to be selectively switched by selectively supplying at least one pilot fluid:

at a first pressure to the first pilot chamber of the pilot valve assembly thereof and at a second pressure to the second pilot chamber of the pilot valve assembly thereof; and then at the second pressure to the first pilot chamber of the pilot valve assembly thereof and at the first pressure to the second pilot chamber of the pilot valve assembly thereof.

17. The fluid system according to claim 16, wherein each of the first and second bi-directional check valve assemblies comprises:

a check valve housing fluidically coupled to one of the working chamber ports of the pump/motor; and the movable member disposed within an interior of the check valve housing for axial movement therein, the movable member defining a check valve chamber within the check valve housing, the movable member having open and closed positions that enable and prevent, respectively, the working fluid from entering or leaving the working chamber through the corresponding one of the working chamber ports.

18. The fluid system according to claim 17, wherein each of the bi-directional check valve assemblies of the fluid control valve system further comprises:
   first and second fluid ports through which the working fluid enters and exits the check valve housing, the first fluid port being fluidically coupled to the fluid source or destination of the working fluid and the second fluid port being fluidically coupled to the corresponding one of the working chamber ports of the pump/motor, the first and second fluid ports being fluidically connected via the interior of the check valve housing when the movable member is in the open position, the first and second fluid ports being fluidically isolated from each other by the movable member when the movable member is in the closed position;
   wherein the controlling means enable each of the first and second bi-directional check valve assemblies to selectively check flow of the working fluid flowing from the first fluid port to the second fluid port thereof and then check flow of the working fluid flowing from the second fluid port to the first fluid port thereof.

19. The fluid system according to claim 18, wherein the movable member of each of the first and second bi-directional check valve assemblies comprises at least one passageway therethrough that fluidically connects the check valve chamber within the check valve housing to the second fluid port of the check valve housing.

20. The fluid system according to claim 16, wherein the controlling means of each of the first and second bi-directional check valve assemblies comprises a third valve assembly that selectively switches the at least one pilot fluid at the first and second pressures between the first and second pilot chambers thereof.

21. The fluid system according to claim 20, wherein the third valve assembly of each of the first and second bi-directional check valve assemblies is a two-position four-way valve assembly.

22. The fluid system according to claim 20, wherein the controlling means of each of the first and second bi-directional check valve assemblies further comprises means for electrically controlling whether the third valve assembly selectively switches the at least one pilot fluid at the first and second pressures between the first and second pilot chambers of the first and second bi-directional check valve assemblies.

23. The fluid system according to claim 16, wherein the at least one pilot fluid supplied at the first pressure to the pilot valve assembly of the first bi-directional check valve assembly is a portion of the working fluid from the fluid source, the at least one pilot fluid supplied at the first pressure to the pilot valve assembly of the second bi-directional check valve assembly is a portion of the working fluid from the destination, and the at least one pilot fluid supplied at the second pressure to the pilot valve assemblies of the first and second bi-directional check valve assemblies is a portion of the working fluid within the working chamber.

24. The fluid system according to claim 16, wherein the movable member of each of the first and second bi-directional check valve assemblies is a poppet.

* * * * *